United States Patent [19]

Adiga

[11] Patent Number: 6,162,361
[45] Date of Patent: Dec. 19, 2000

[54] PLATING WASTE WATER TREATMENT AND METALS RECOVERY SYSTEM

[76] Inventor: Mahabala R. Adiga, 35 Woodridge Crescent #5, Nepean, Ontario, Canada, K2B 7T5

[21] Appl. No.: 08/799,308

[22] Filed: Feb. 14, 1997

Related U.S. Application Data

[60] Provisional application No. 60/011,642, Feb. 14, 1996.

[51] Int. Cl.[7] .................................................. B01D 61/00
[52] U.S. Cl. .......................... 210/652; 210/641; 210/653; 210/651; 204/450; 204/DIG. 13
[58] Field of Search ..................................... 210/636, 791, 210/770, 774, 651, 650, 195.2, 333.1, 333.01, 703, 705, 776, 641, 263, 274, 652, 653; 204/DIG. 13, 450

[56] References Cited

U.S. PATENT DOCUMENTS

| | | |
|---|---|---|
| 3,637,467 | 1/1972 | Spatz . |
| 3,674,669 | 7/1972 | Tuwiner . |
| 3,766,049 | 10/1973 | Smith . |
| 3,806,436 | 4/1974 | Tuwiner . |
| 3,925,202 | 12/1975 | Hirs .......................................... 210/799 |
| 4,111,772 | 9/1978 | Horn . |
| 4,255,255 | 3/1981 | Ogawa et al. ........................... 210/652 |
| 4,555,345 | 11/1985 | Yoshida ................................... 210/705 |
| 4,655,928 | 4/1987 | Milton . |
| 4,702,838 | 10/1987 | Babcock et al. ......................... 210/651 |

(List continued on next page.)

OTHER PUBLICATIONS

Donnelly, R.G., et al., Reverse Osmosis Treatment of Electroplating Wastes, AES Research Project 32. *Plating* Magazine, May of 1974.

Golomb, A., Application of Reverse Osmosis to Electroplating Waste Treatment, AES Research Project 31. *Plating* Magazine, Apr. 1972.

Markovac, V. and Heller, H.C., Engineering Aspects of Electrodialysis for Nickel Plating Rinsewater, Plating and Surface Finishing, Jan., 1982.

Markovac, V. and Heller, H.C., Principles of Electrodialysis for Nickel–Plating Rinsewater, Dec., 1981.

Unknown, Treatment of Electroplating Rinsewaters By Reverse Osmosis, AES Research Projects 32 and 39—Interim Report. *Plating and Surface Finishing* Magazine, Nov. 1977.

Eisenmann, John L., Recovery of Nickel From Plating Bath Rinse Waters By Electrodialysis, Plating and Surface Finishing, Nov., 1977.

Grinstead, Robert R. and Paalman, H. Hunter, Metal Ion Scavenging from Water with Fine Meshlon Exchangers and Microporous Membranes, Environmental Progress (vol. 8, No. 1), Feb., 1989.

Raman et al. "Consider Nanofiltration for Membrane Separations", Chemical Engineering Progress, Mar. 1994.

*Primary Examiner*—Ana Fortuna
*Attorney, Agent, or Firm*—Gardner & Groff, P.C.

[57] ABSTRACT

A process for removing heavy metal ions or cyanide ions from a waste water stream originating in a metal plating plant or a mine comprising the steps of pretreatment in which the waste water stream is first pretreated by removing particulates, fats and oils; filtration by means of a first sand filter to remove suspended particulates down to 50 microns, a second bag filter to remove suspended particulates down to 3.5 microns, a third micro filter to remove particulates down to 0.1 microns in size and a fourth ultrafilter to remove particulate down to a molecular weight of 10,000; concentration of the heavy metal ions in the waste water stream by means of a first stage nanofiltration unit and second stage nanofiltration unit or reverse osmosis membrane unit down to a molecular weight of about 200 with nanofiltration and less by reverse osmosis; increase the concentration of heavy metal species in the waste water stream to above 700 ppm; electrodialysis to further increase the concentration of heavy metal ions in the waste water stream to approximately 6000 ppm; electrolysis to remove heavy metal ions. Alternatively, ion exchange columns can be used to remove the heavy metal ions after the filtration and concentration in the nanofiltration membranes.

9 Claims, 1 Drawing Sheet

| | | |
|---|---|---|
| 4,880,511 | 11/1989 | Sugita . |
| 4,885,095 | 12/1989 | Rich .......................................... 210/636 |
| 4,895,659 | 1/1990 | Semmens et al. . |
| 5,244,580 | 9/1993 | Li ............................................ 210/691 |
| 5,277,817 | 1/1994 | Martyak et al. ......................... 210/651 |
| 5,328,616 | 7/1994 | Martyak et al. ......................... 210/652 |
| 5,364,529 | 11/1994 | Morin et al. ............................ 210/608 |
| 5,405,532 | 4/1995 | Loew et al. . |
| 5,776,340 | 7/1998 | Jangbarwala et al. ................... 210/274 |

OTHER PUBLICATIONS

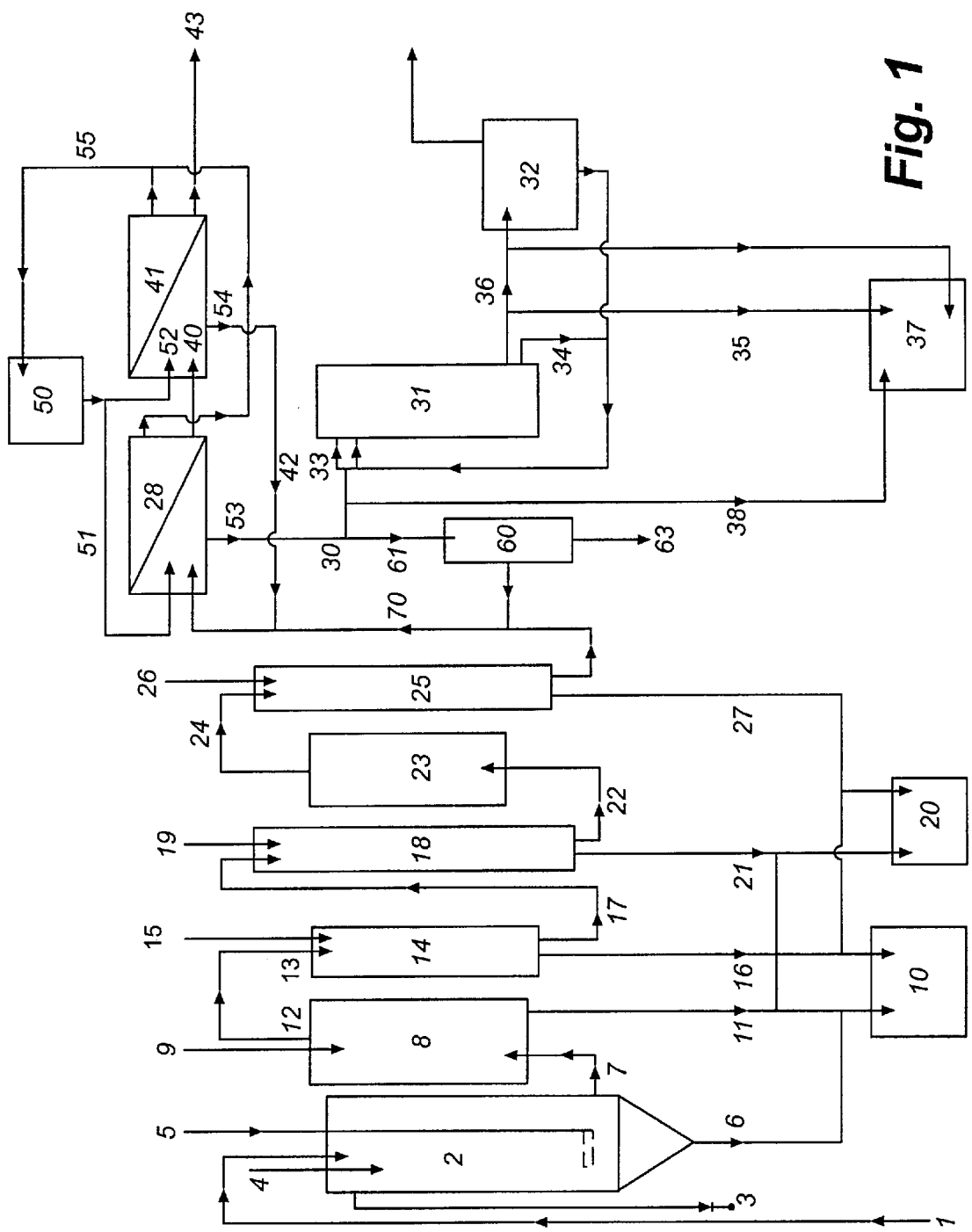

PLATING WASTE WATER TREATMENT AND METALS RECOVERY SYSTEM

This application claims benefit to provisional application 60/011,642 filed Feb. 14, 1996.

FIELD OF THE INVENTION

The present invention relates to a method for recovering heavy metals from the rinse water waste stream from metal plating industries. More particularly, the invention relates to a hybrid process for the efficient recovery of heavy metals involving micro filtration, adsorption, a combination of nanofiltration and reverse osmosis, electrodialysis, electrolysis and ion exchange.

BACKGROUND OF THE INVENTION

The metal plating industry consumes enormous amounts of water for rinsing the plated materials. The consumption of water can be in the range of from 10 liters per minute up to 1200 liters per minute depending on the size of the process. The rinse water becomes contaminated during the plating process when the plated object is rinsed upon removal from the plating bath. The contaminated rinse water is toxic as it can contain several heavy metals such as chrome, copper, zinc, lead, nickel, iron and chemicals such as cyanide. Therefore it cannot be released to the environment without further treatment to remove the heavy metal ions and toxic compounds.

In conventional waste water treatment, heavy metal contaminated waste streams are treated with a complexing agent such as sodium, magnesium or calcium hydroxide to form a metal complex. The metal complex is then precipitated out of the waste stream and settles by gravity to the bottom of a holding tank. The waste water in the holding tank is then clarified by removing the precipitate.

The effluent, which is highly alkaline, neutralized by acid dosing. After this treatment process, the waste water stream can still contain up to 10 mg per liter of heavy metals which is an unacceptable concentration for release to the environment. In order to meet the environmental standards for this type of waste water discharge, which are in the range of 1 to 2 mg per liter for sewer discharge and 0.1 to 0.5 mg per liter for open water discharge, the waste stream must be further treated using a series of ion exchange columns to remove heavy metal ions. While the final concentrations of contaminants released to the environment may be within environmental guidelines, such releases do place additional strain on municipal sewage systems and will accumulate in the environment with detrimental long term effects on the biosphere. The precipitated sludge containing the concentrated heavy metal hydroxide is an extremely hazardous waste and must be disposed of using special facilities at great expense to industry.

The cost of buying water for metal plating industries ranges from $6000.00 to $10,000.00 per year for a process consuming 40 liters per minute. Therefore, there is a need to reduce this cost by recycling as much of the process water as possible.

There are a number of known heavy metal recovery systems. For example, U.S. Pat. No. 4,880,511, entitled "PROCESS AND APPARATUS FOR RECOVERY OF PRECIOUS METAL COMPOUND" issued to Sugita on Nov. 14, 1989, describes a process and apparatus for recovery of precious metal compounds such as gold. This process utilizes a reverse osmosis membrane to separate the contaminant from the waste stream. The contaminant is further concentrated using an electrodialysis process employing anion-exchange columns and cation-exchange columns. The use of a reverse osmosis membrane means that waste stream operating at higher pressures (typically in the range of 250 psi to 400 psi) and flow rates must be kept high to create turbulence otherwise membranes will quickly foul. Therefore, this process is not well suited to industrial plating industries due to a greater tendency towards membrane foiling because of higher pressures and increased power input. The waste stream is preferably processed at low pressures to reduce energy input and high velocity to reduce membrane foiling. U.S. Pat. No. 4,678,584 entitled "METHOD OF REMOVING HEAVY METAL FROM WASTEWATER STREAMS" issued to Elfine on Jul. 7, 1989, teaches a method for treating heavy metal-containing wastewater streams using sodium trithiocarbonate as a complexing agent and then precipitating the heavy metal complex out of the waste water. The resulting concentrated heavy metal sludge is further processed using standard metallurgical techniques to remove the metals in economically useful forms. This method still rests in a heavy metal sludge which requires further processing and disposal and therefore added operating expenses.

SUMMARY OF THE INVENTION

It is an object of the present invention to solve the problems and disadvantages associated with the known systems for heavy metal contaminated rinse water treatment by providing a method which eliminates the need to consume large amount of precipitate and reliance upon expensive ion-exchange columns to finish the purification process; has a significantly improved heavy metal ion recovery efficiency; and facilitates the recovery of process water for reuse.

In one embodiment of the present invention there is provided a method for recovering heavy metals from a waste water stream comprising the steps of: waste water pretreatment to remove solids and suspended oils and fats from the waste water; waste water filtration to filter suspended particulate matter from the waste water; waste water adsorption to remove volatile organic compounds and hydrocarbons from the waste water; heavy metal concentration to increase the concentration of heavy metal ions in the waste stream; and, heavy metal removal to remove the heavy metal ions from the waste stream.

In another embodiment the present invention the waste water pretreatment comprises the steps of storing a large volume of waste water contaminated with heavy metal ions in a sedimentation/aeration tank; separating suspended fats and oils from the waste water by steam injection means; removing the floating oils, fats and solids from the surface of the waste water by a surface skimming means; injecting compressed air or oxygen into the waste water storage tank by injection means in order to oxidize any organic compounds suspended in the waste water; precipitating any suspended solids from the waste water by adding a precipitating agent; collecting by gravity the precipitated material at the bottom of the said tank; and, removing the precipitated material from the bottom of the said tank by removal means; and, further processing the precipitate material for disposal using processing means.

In yet another embodiment of the present invention the waste water filtration phase comprises the steps of passing said pretreated waste water from said sedimentation/aeration tank to a sand filter; passing the effluent from said sand filter to bag filter; passing the effluent from said bag filter to a micro filter; passing the effluent from said micro filter to an ultrafilter.

In still another embodiment of the present invention, said adsorption comprises passing the effluent from the said micro filter through an adsorber to remove volatile organic compounds and volatile organic hydrocarbons.

In another embodiment of the present invention the heavy metal concentration comprises passing the pre-treated, filtered and adsorbed waste water stream through a first and second filter to concentrate the heavy metal concentration in the waste water stream; passing said concentrated waste water stream from the filter means to an electrodialysis device for further concentration of heavy metal ions. The first and second filters can be nanofiltration membranes or a combination of nanofiltration membranes and reverse osmosis membranes depending on the requirement of the system.

In still a further embodiment of the invention, heavy metal removal is accomplished by electrolysis. Alternatively, heavy metal removal can be accomplished by a plurality of ion exchange columns.

In yet another embodiment of the invention there is a method for separating and concentrating cyanide or cyanide complexes using nanofiltration membranes whereby the concentrated cyanide can be easily oxidized in the final stage and totally removed from the final treated water stream.

BRIEF DESCRIPTION OF THE DRAWINGS

The present invention will be further understood from the following description with references to the drawing in which:

FIG. 1 illustrates a schematic of one embodiment of the apparatus and process of present invention.

DETAILED DESCRIPTION

The process of the present invention uses a pretreatment phase, a concentration phase and an ion removal phase.

Pretreatment Phase

The preferred embodiment of the present invention involves an extensive pretreatment phase in order to remove particulates which could ultimately foul the nanofiltration membranes and reverse osmosis membranes. This allows for increased life of the membranes and a more reliable process. Pretreatment also removes organic compounds and volatile organic compounds and hydrocarbons.

Course Solid, Oil and Fat Removal

Referring to FIG. 1, in the pre-treatment phase, the rinse water waste stream (1) follows the direction of the arrows as shown. Raw waste water (1) is fed to a sedimentation/aeration unit (2) where floating substances such as solids, oil and fat are removed by skimming. If the raw waste water (1) in tank (2) contains a large amount of suspended oils and fats, a small amount of steam can be added to the tank (2) by steam injection inlet (5) which will facilitate the separation and floatation of the oil and fat substances. This waste is removed from the top of the sedimentation tank (2) through outlet (3) for further conventional treatment and disposal. The waste water stream (1) may also contain a high biological oxygen demand due to contamination by organic material. To oxidize this organic material, compressed air is forced into the settlement/aeration tank (2) by way of compressed air inlet (5). A suitable coagulant/flocculant agent is then added through inlet (4) to precipitate the organic material and suspended solids to the bottom of the tank (2). Floc and sediment sludge settle to the bottom of tank (2) and are removed from the bottom of tank (2) by way of outlet (6). The sludge is then transferred to an evaporator (10) where the remaining water is removed. The dried sludge is then disposed of in a conventional manner.

Backwash Phase

The clarified effluent from the settlement/aeration tank (2) is then transferred by way of outlet (7) to a multimedia graded sand filter (8). This filter will remove fine suspended solids down to 50 microns. The sand filter (8) is back washed by way of inlet (9). The backwash discharge is removed from the sand filter (8) by way of outlet (11) and is transferred to evaporator (10) for further drying and the dried sludge is disposed of in a conventional manner. The back washed effluent is transferred from the backwash filter (8) by way of outlet (12) to bag filter (14) by way of inlet (13).

Bag Filtering

Bag filter (14) contains a series of filtration stages. The first stage of bag filter (14) will remove particulates larger than 35 microns. The second stage of bag filter (14) will remove particulates larger than 15 microns. The third stage of bag filter (14) will remove particulates larger than 3.5 microns. Bag filter (14) is periodically flushed by way of water inlet (15). The flushed particulate matter is transferred to evaporator (10) by way of outlet (16). The flushed particulate is further dried and disposed of in a conventional manner.

Micro Filtration

From bag filter (14), the effluent is transferred by way of outlet (17) to micro filter (18) capable of filtering to 0.2 micron or 0.1 micron. The micro filter (18) can be a one or two stage cartridge type filter or, alternatively, a back flushed membrane filter. The filter (18) is cleansed by way of back flush inlet (19) and backwash from micro filter (18) is transferred to evaporator (20) by way of outlet (21) for further drying and disposal by conventional means. If the process flow is less than 100 liters per minute, then a cartridge filter is suitable. However, for process flows greater than 100 liters per minute and containing a large load of suspended particulates, a back flushed membrane filter unit is preferred.

Adsorption

If the effluent contains a large concentration of volatile organic compounds (VOCs) or volatile organic hydrocarbons (VOHs) the process will include an adsorption unit (23) located between micro filter (18) and ultrafilter (25). The adsorber is generally an activated carbon filter.

Ultrafiltration

The effluent exits adsorber (23) by way of outlet (24) and is transferred to ultrafilter (25). Ultrafilter (25) will filter out particulates having molecular weights greater than 10,000. This filtering will increase the longevity of the nanofilters (28) and reverse osmosis membranes (41). Without ultrafiltration, there is an increased risk that the nanofiltration membranes (28) and/or reverse osmosis membranes (41) will foul during use. Ultrafilter (25) is periodically flushed clean by way of backwash inlet (26). The backwash from the ultrafilter (25) is transferred by way of outlet (27) to the evaporator (20) or evaporation (10) for further drying and conventional disposal. However, for water having less tendency to foul from biological or chemical foulants the ultrafiltration stage may be eliminated.

Concentration Phase

The concentration phase comprises a first stage of nanofiltration and a second stage of nanofiltration or reverse osmosis followed by electrodialysis. Concentration of the heavy meal ion contaminant will greatly improve the heavy metal ion contaminant removal efficiency of the electrolysis device (32). The first stage and second stage nanofiltration membranes include a plurality of nanofiltration membranes connected in series/parallel arrangements.

Nanofiltration

The prefiltered effluent stream (70) is transferred to nanofiltration unit (28) which has a molecular weight cut off between 180 and 300 depending on the type and surface charge characteristics of the nanofiltration membrane used. In operation, nanofiltration unit (28) will filter out metal ions and metal complexes with an efficiency of 70% to 97% depending upon such operation parameters as effluent stream pH, operating pressure, type and ionic charge of the heavy metal contaminant, operating temperature of the waste water stream and the concentration of the heavy metal contaminant in the effluent stream. Where the feed concentration of heavy metal contaminants is in the range of 3 ppm to 300 ppm, water recovery from nanofilter (28) will be in the range of 90% to 99.5%. However a recovery of 99.5% or higher can be achieved where the feed concentration of heavy metal ions ranges between 3 ppm to 30 ppm.

EXAMPLE

Effluent (70) contains a heavy metal concentration of 30 ppm. The average rejection characteristic of nanofiltration membrane (28) is 85%. The nanofiltration unit is operated to achieve a water recovery rate of 98%. The resulting nanofiltration yields a permeate stream (40) and a concentrate stream (30). The permeate stream (29) will contain 98% of the water and a heavy metal concentration of about 4.6 ppm, The concentrate stream (30) will contain about 2% of the water but about 1275 ppm of heavy metal.

Tank (50) holds a membrane cleaning solution in the form of either an weak solution of organic acid or an anion detergent solution normally 1% to 5% concentration by volume. The cleaning of the membranes is done when the process is stopped and the nanofiltration membranes and reverse osmosis membranes are isolated from the process by suitable valving means. Cleaning solution from tank (50) is fed into nanofiltration membrane (28) as well as reverse osmosis membrane (41) by way of recirculating lines (51) and (52). The solution then exits the nanofiltration membrane by way of line (53) and the reverse osmosis membrane by line (54). Line (53) and (54) are connected to recirculation line (55) and the clean solution is returned to tank (50). After several cleaning cycles the contents of tank (50) is changed.

The more toxic varieties of heavy metal such as chrome, have statutory discharge limits far less than 2 ppm. Therefore, permeate stream (40) will have to meet these discharge requirements. To accomplish this, second stage nanofiltration unit (41) will be required. Permeate stream (40) can be transferred to second nanofiltration membrane (41) or alternatively to second stage reverse osmosis membrane (41) if discharge requirements warrant a much lower discharge limit, as in the case of chrome.

EXAMPLE

Permeate stream (40) exiting from nanofiltration unit (28) has a heavy metal ion concentration of 5 ppm. It will be fed to the second nanofiltration unit (41) whose filtration "mesh" will be "tighter", that is with a molecular weight cut off between 100 and 180. Alternatively, a low pressure reverse osmosis membrane rated at 98% salt rejection could be used to achieve significantly superior filtration results for those applications when zero discharge is mandatory.

EXAMPLE

Using a second nanofiltration unit (41), with 85% metal rejection and 99% water recovery in a recirculation mode, the concentration of heavy metal ions in the effluent stream (42), comprising 1% of the volume of intake stream (40) would be in the range of 425 ppm. This stream is recirculated back to the nanofiltration unit (28) by way of inlet (70). The permeate stream (43) comprising 99% of the volume of intake stream (40) would have a heavy metal ion concentration of 0.76 ppm and can be recycled back to the metal plating process.

EXAMPLE

Using reverse osmosis membranes (41) having a 98.5% metal rejection and operating the unit at 99% water recovery in a recirculating mode, the heavy metal concentration in the permeate stream (43) would be in the range of 0.08 ppm. This water stream can then be directly recycled into the metal plating process. The heavy metal ion concentration in the concentrate stream (42) would be in the range of 492.5 ppm and recirculated back to nanofiltration unit (28).

Ion Exchange Columns

As an alterative to using electrodialysis concentration and electrolytic metal removal, the concentrate stream (30) from the nanofiltration/reverse osmosis units (28 & 41) can be sent to an chelating metal ion exchange column (60) by way of feed line (61). Anticipated efficient (63) heavy metal ion concentrations would be in the range of 0.5 ppm to 2.0 ppm.

Electrodialysis Concentration

If the concentrate stream (30) from nanofiltration membrane (28) is high enough, that is in excess of 2000 ppm then the stream can be passed directly to the electrolysis unit. However, where this is not the case, the stream must be further concentrated. This can be done by passing the stream through a direct current electrodialysis device (31) which will further concentrate the heavy metal ions and therefore reduce the electrical resistance across the electrolysis device (32). The concentrate stream (30) is transferred to the electrodialysis unit (31) by way of inlet (33). The metal ions are separated from the stream by passing through a series of specially designed stacks of ion exchange membranes. The resulting dilute stream (34) comprises between 70% and 95% of the water entering the electrodialysis device depending upon the initial concentration of heavy metal ions in the stream (30) from the nanofiltration unit (28). The diluate stream (34) contains a heavy metal concentration of between 300 ppm and 600 ppm and is fed back to the electrodialysis unit (31) by way of return line (35) for further concentration. Electrodialysis prior to electrolysis will reduce the amount of energy required to recovery the heavy metal ions and improves the overall efficiency of heavy metal recovery.

EXAMPLE

The concentration of heavy metal ions in effluent stream (30) from nanofiltration unit (28) is 1275 ppm. This concentrate enters the electrodialysis unit (31) operating at a water recovery efficiency of 85%. 85% of the unit intake (30) will exit as dilute (34) containing approximately 400 ppm of heavy metal ions. The remaining 15% of flow will be concentrate (36) having a heavy metal concentration of 6233 ppm of metal ions. This concentrate stream is then transferred to the electrolytic metal recovery unit (32). Similarly, if the electrodialysis unit (31) is operating to obtain a metal ion concentration of 500 ppm in dilute stream (34) the resulting concentrate stream (36) transferred to the electrolytic unit (32) will have a heavy metal ion concentration of 5666 ppm. If the efficiency of the electrodialysis unit (31) is set to 90% water recovery for an intake stream (30) concentration of 1275 ppm, the concentrate stream (36) will have a heavy metal concentration of 8250 ppm. The electrolytic recovery unit (32) will operate more efficiently with higher concentrate stream (36) heavy metal ion concentrations.

If the concentration of heavy metal ions in the concentrate exiting the nanofiltration unit (28) is sufficiently high, the electrodialysis unit is not necessary and may be omitted from the process. Concentrate could then be transferred directly from the nanofiltration unit (28) to the electrolysis unit (32) for heavy metal ion removal.

Metal Removal Phase

Electrolysis

Concentrated effluent stream (36) leaving electrodialysis unit (31) is transferred to electrolytic unit (32) for electrolytic metal recovery which is a well known process.

The metal recovery process herein described is best suited for a waste water process stream of between 25,000 liters per day and 1,000,000 liters per day.

For smaller electroplating operations where the anticipated waste water stream is between 6000 liters per day and 25,000 liters per day, waste water stream (34) exiting from electrodialysis unit (31) can be transferred to evaporator (37) by way of transfer line (39) for metals recovery rather than rely upon electrolysis (32).

For very small electroplating operations where the anticipated waste water stream is between 5000 liters per day and 10,000 liters per day, concentrate stream (30) from nanofiltration unit (28) can be fed directly to the evaporator (37) by way of transfer line (38) rather than rely upon electrodialysis unit (31) and electrolysis (32).

Numerous modifications, variations and adaptations may be made to the particular embodiments of the invention described above without departing from the scope of the invention, which are defined in the claims.

What is claimed is:

1. A method for the separation and recovery of heavy metals from a waste water stream having heavy metals therein, the method comprising the steps of:
    a) passing the waste water stream through a plurality of nanofiltration membranes having a permeate output stream and a concentrate output stream, said plurality of nanofiltration membranes being arranged in a series/parallel arrangement to concentrate the heavy metals in the concentrate output stream; and
    b) passing the concentrate output stream through an electro dialysis device for additional concentration of heavy metal ions.

2. A method as claimed in claim 1, further comprising passing the permeate output stream through a plurality of nanofiltration membranes arranged in a series/parallel arrangement.

3. A method as claimed in claim 2 wherein said first stage nanofiltration membranes have a molecular weight cut-off of between about 180 and about 300 and wherein said second stage nanofiltration membranes have a molecular weight cut-off of between about 100 and about 200.

4. A method as claimed in claim 2 wherein permeate water from said second stage nanofiltration is recovered.

5. A method as claimed in claim 1 further comprising passing the permeate output stream through a second stage low-pressure reverse osmosis membranes arranged in series/parallel arrangement.

6. A method as claimed in claim 5 wherein said first stage nanofiltration membranes have a molecular weight cut-off of between about 180 and about 300 and wherein said second stage low-pressure reverse osmosis membranes have a salt rejection of between about 90% and about 98%.

7. A method as claimed in claim 5 wherein permeate water from said second stage low-pressure reverse osmosis membranes is recovered.

8. A method as claimed in claim 1 wherein said electro dialysis device operates on direct current.

9. A method for the separation and recovery of heavy metals from a waste water stream having heavy metals therein, the method comprising the steps of:
    a) passing the waste water stream through a plurality of nanofiltration membranes having a permeate output stream and a concentrate output stream, said plurality of nanofiltration membranes being arranged in a series/parallel arrangement to concentrate the heavy metals in the concentrate output stream; and
    b) passing the concentrated output stream through an electro dialysis device for additional concentration of heavy metal ions;
    wherein prior to said step of passing the waste water stream through a plurality of nanofiltration membranes, the waste water stream is pre-treated including the following steps:
        i) pre-treating the waste water to remove solids, suspended oils, and fats from the waste water;
        ii) filtering the waste water to filter suspended particulate matter from the waste water; and
        iii) removing volatile organic compounds and hydrocarbons from the waste water through adsorption.

* * * * *